US008235662B2

(12) United States Patent
LeClair et al.

(10) Patent No.: US 8,235,662 B2
(45) Date of Patent: Aug. 7, 2012

(54) WIND TURBINE METROLOGY SYSTEM

(75) Inventors: Ryan M. LeClair, Wilton, NY (US);
Thomas P. Schmitt, Saint Johnsbury, VT (US); Saskia G. Honoff, Salzbergen (DE); Clinton L. Williams, Tehachapi, CA (US); Thomas H. Siebers, Neuenkirchen (DE); Donald M. Rogers, Greer, SC (US); Christopher J. Winslow, Esperance, NY (US)

(73) Assignee: General Electric Company, Schenectady, NY (US)

( * ) Notice: Subject to any disclaimer, the term of this patent is extended or adjusted under 35 U.S.C. 154(b) by 1211 days.

(21) Appl. No.: 11/869,011

(22) Filed: Oct. 9, 2007

(65) Prior Publication Data
US 2009/0142192 A1    Jun. 4, 2009

(51) Int. Cl.
*F03D 7/02* (2006.01)
(52) U.S. Cl. .................. 416/61; 416/37; 416/41
(58) Field of Classification Search .................. 415/118; 416/61, 37, 41
See application file for complete search history.

(56) References Cited

U.S. PATENT DOCUMENTS

| 2,360,791 | A | * | 10/1944 | Putnam | 416/37 |
| 4,084,921 | A | * | 4/1978 | Norz | 416/17 |
| 4,360,888 | A | | 11/1982 | Onksen et al. | |
| 4,893,261 | A | | 1/1990 | Flint, III et al. | |
| 5,874,673 | A | | 2/1999 | Greene | |
| 6,938,472 | B2 | | 9/2005 | Kaushik et al. | |
| 2002/0047275 | A1 | | 4/2002 | Wobben | |
| 2005/0034516 | A1 | * | 2/2005 | Yoshida | 73/170.01 |
| 2006/0140764 | A1 | * | 6/2006 | Smith et al. | 416/103 |
| 2007/0075546 | A1 | | 4/2007 | Avagliano et al. | |
| 2007/0086893 | A1 | * | 4/2007 | Pedersen | 416/61 |

FOREIGN PATENT DOCUMENTS

EP    1288 494 B1    7/2005
GB    2067247 A  *   7/1981
* cited by examiner

*Primary Examiner* — Edward Look
*Assistant Examiner* — Jesse Prager
(74) *Attorney, Agent, or Firm* — James W. Pemrick; Ernest G. Cusick; Frank A. Landgraff

(57) ABSTRACT

A wind turbine and system for controlling a wind turbine using a nosecone mounted metrology system is disclosed. The wind turbine comprises at least one wind sensor for determining at least one wind characteristic. The wind sensor is mounted on a boom and located at a predetermined distance outward from the wind turbine nosecone.

4 Claims, 6 Drawing Sheets

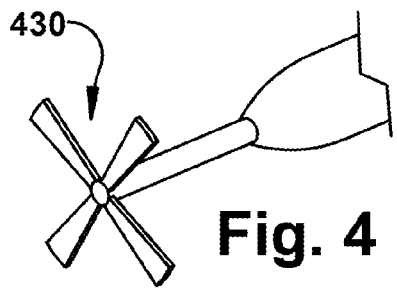
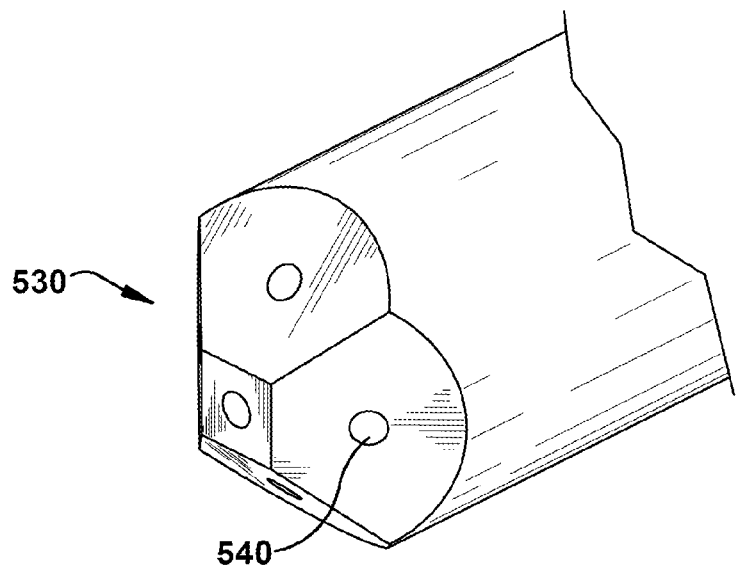
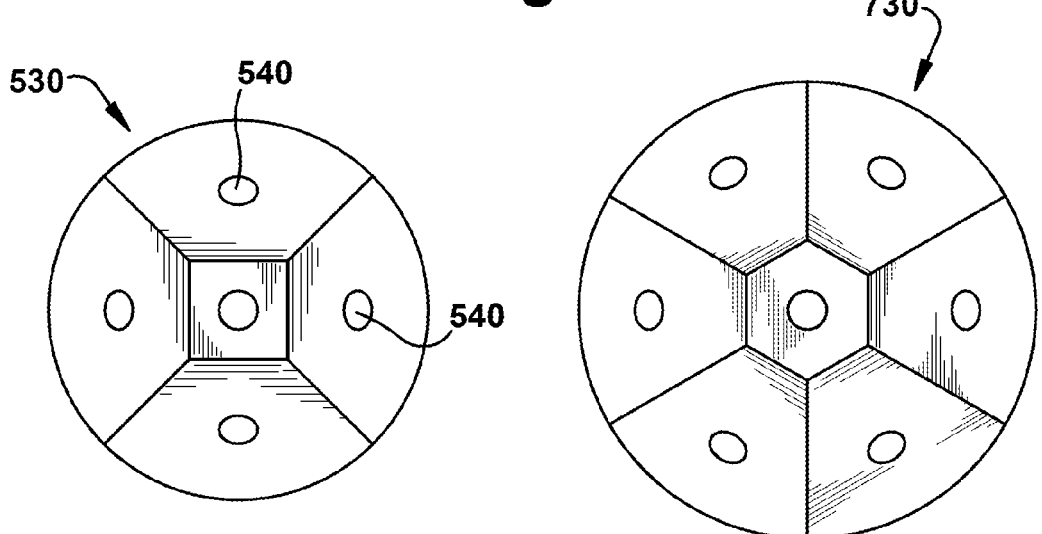

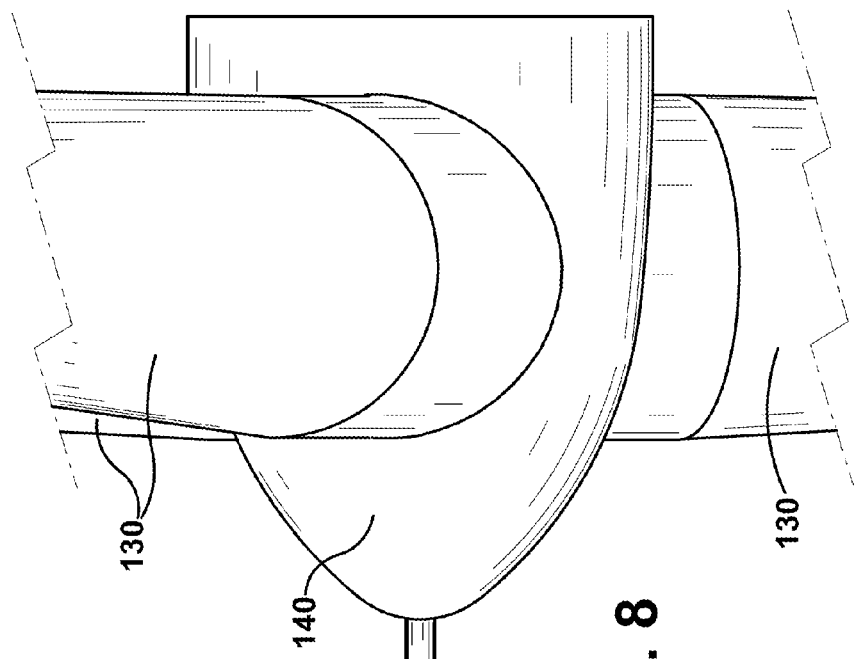
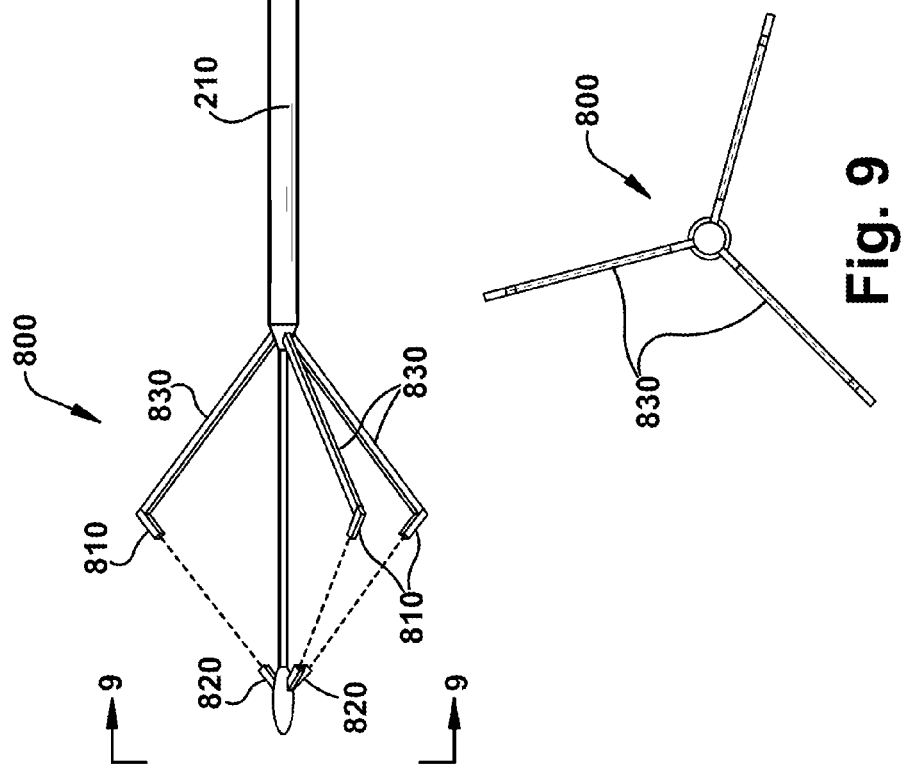

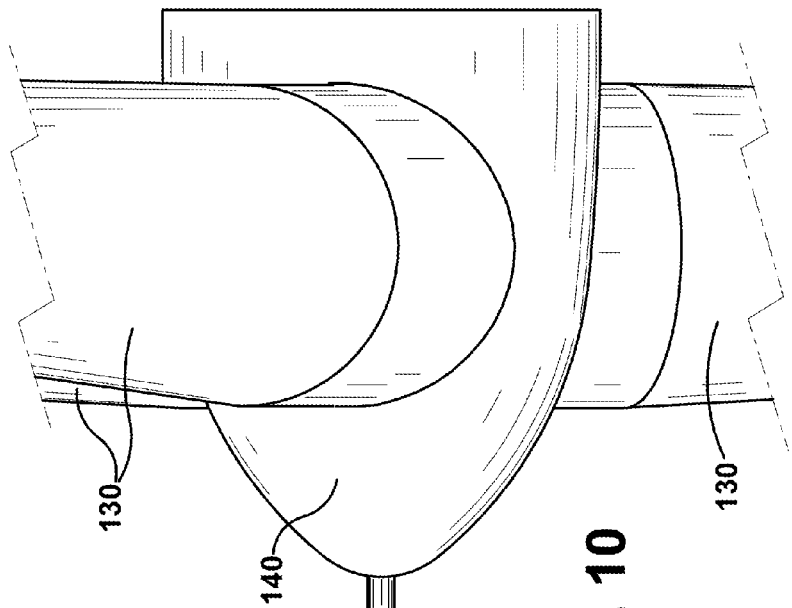
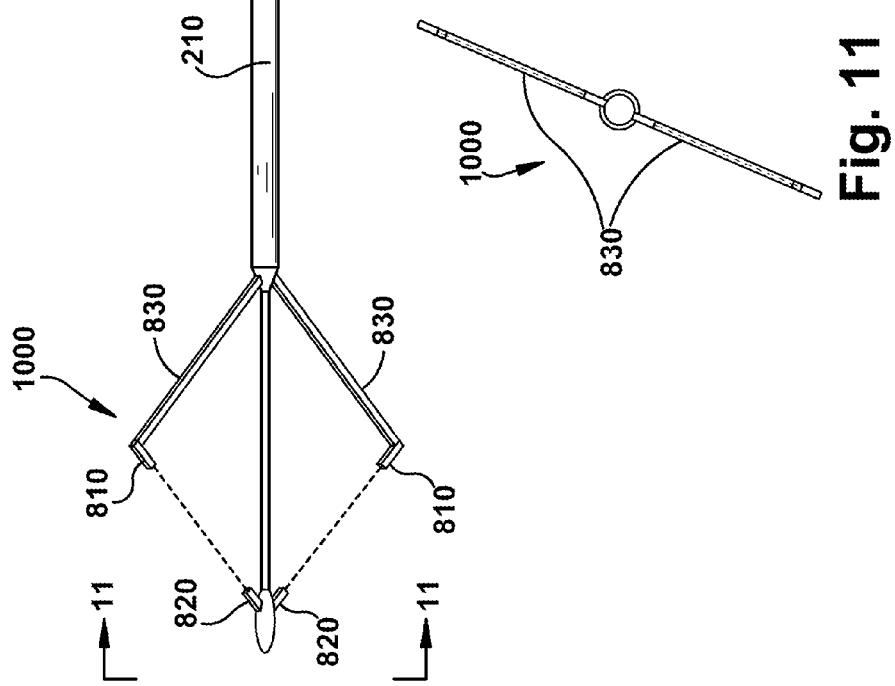
Fig. 10
Fig. 11

WIND TURBINE METROLOGY SYSTEM

BACKGROUND OF THE INVENTION

The apparatus described herein relates generally to metrology systems for wind turbines. More specifically, the apparatus relates to a metrology system located outward from the nosecone of a wind turbine.

Recently, wind turbines have received increased attention as environmentally safe and relatively inexpensive alternative energy sources. Wind turbines do not emit greenhouse gases (GHGs), and therefore, do not contribute to global warming. Wind turbines also allow a country to become more energy independent by the domestic production of electrical energy. With the growing interest in wind generated electricity, considerable efforts have been made to develop wind turbines that are reliable and efficient.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to rotate a shaft and subsequently generate mechanical power or electricity.

Typically, wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades or rotor) for converting the movement of air into a mechanical motion (e.g., rotation), which is then converted with a generator into electrical power.

Power output of a wind turbine generator generally increases with wind speed until a rated power output is reached. Thereafter, the power output is usually maintained constant at the rated value even with an increase in wind speed. This is generally achieved by regulating the pitching action of the blades in response to an increase in wind speed. The wind turbine could also be turned away from the wind (i.e., changing the yaw direction). With increases in wind speed beyond the rated power output, the blades generally are pitched toward feather (i.e., twisted to be more closely aligned with the direction of the wind), thereby controlling the angular speed of the rotor. As a result, generator speed, and consequently, generator output may be maintained relatively constant with increasing wind velocities.

The direction of the wind is also used to correct the yaw direction of the wind turbine. Ideally, the wind turbine should be facing into the wind, the rotor face perpendicular to the direction of wind for maximum power output. The nacelle (and blades) can rotate in a horizontal plane on top of the tower via one or more yaw drives. The yaw direction refers the horizontal direction in which the wind turbine is facing.

Typically, wind-measuring devices (e.g., anemometers, wind vanes, etc.) are mounted on the nacelle and behind the blades or rotor. The disadvantage to having the wind measuring devices mounted downwind and behind the blades/rotor, is that the blades affect the wind speed and direction. As the wind turbine rotor spins it produces various fluid phenomena such as turbulence, vortices, fluid flow shedding, etc. These rotor induced fluid phenomena produce a systematic error in a nacelle mounted wind vane (typical on commercial wind turbines) such that the turbine is not optimally aligned with the oncoming wind. The result can be less than optimum energy production, less than optimum startup operation, storm shutdown operation, and increases in mechanical stress. The same fluid phenomena effects that disturb the wind vane sensor can also effect the wind speed anemometer such that it produces erroneous signals that in turn cause significant errors in the assessment of wind turbine performance.

In case of sudden gusts, wind speed may increase drastically in a relatively small interval of time. Maintaining the power output of the wind turbine generator constant during such sudden gusts calls for relatively rapid changes of the pitch angle of the blades. However, there is typically a time lag between the occurrence of a gust and the actual pitching of the blades based upon dynamics of the pitch control actuator and the inertia of the mechanical components. As a result, generator speed, and hence power, may increase considerably during such gusts, and may exceed the maximum prescribed power output level (also known as overspeed limit) causing the generator to trip, and in certain cases, the wind turbine to shut down. The overspeed limit is generally a protective function for the particular wind turbine generator and is based upon fatigue considerations of the mechanical components, such as the tower, drive train, and so forth. Moreover, sudden gusts may also significantly increase tower fore-aft and side-to-side bending moments due to increase in the effect of wind shear.

Accordingly, there exists a need for an improved system to monitor and measure wind speed and wind direction, which may be used to control the various operating characteristics (e.g., yaw direction and pitching of the blades) of a wind turbine.

BRIEF DESCRIPTION OF THE INVENTION

In one aspect of the present invention, a wind turbine comprising boom mounted sensing means is provided. The sensing means can be used to determine at least one wind characteristic at a predetermined distance outward from a wind turbine rotor.

According to another aspect of the present invention, a wind turbine comprising at least one wind sensor is provided. The wind sensor can be used to determine at least one wind characteristic at is located at a predetermined distance outward from the wind turbine's nosecone. At least one operating mode of the wind turbine can be controlled based on the sensed wind characteristic.

According to yet another aspect of the present invention, a wind turbine comprising at least one wind measuring device located in a first direction and at a first distance from the wind turbine is provided. The first direction is in a generally windward direction when the wind turbine is facing substantially into the wind. The first distance is about one to about ten meters in length. The wind measuring device is mounted on a boom, and the boom is attached to the nosecone of the wind turbine.

BRIEF DESCRIPTION OF THE DRAWINGS

FIG. 4 is a partial, side illustration of a propeller anemometer that could be used with the wind turbine as illustrated in FIG. 2.

FIG. 5 is a partial, side illustration of a five-hole pressure anemometer that could be used with the wind turbine as illustrated in FIG. 2.

FIG. 6 is an end illustration of a five-hole pressure anemometer that could be used with the wind turbine as illustrated in FIG. 2.

FIG. 7 is an end illustration of a seven-hole pressure anemometer that could be used with the wind turbine as illustrated in FIG. 2.

FIG. 8 is an illustration of a three-pair ultrasonic anemometer that could be used with the wind turbine as illustrated in FIG. 2.

FIG. 9 is an end illustration of the three-pair ultrasonic anemometer shown in FIG. 8.

FIG. 10 is an illustration of a two-pair ultrasonic anemometer that could be used with the wind turbine as illustrated in FIG. 2.

FIG. 11 is an end illustration of the two-pair ultrasonic anemometer shown in FIG. 8.

DETAILED DESCRIPTION OF THE INVENTION

Figure 1:
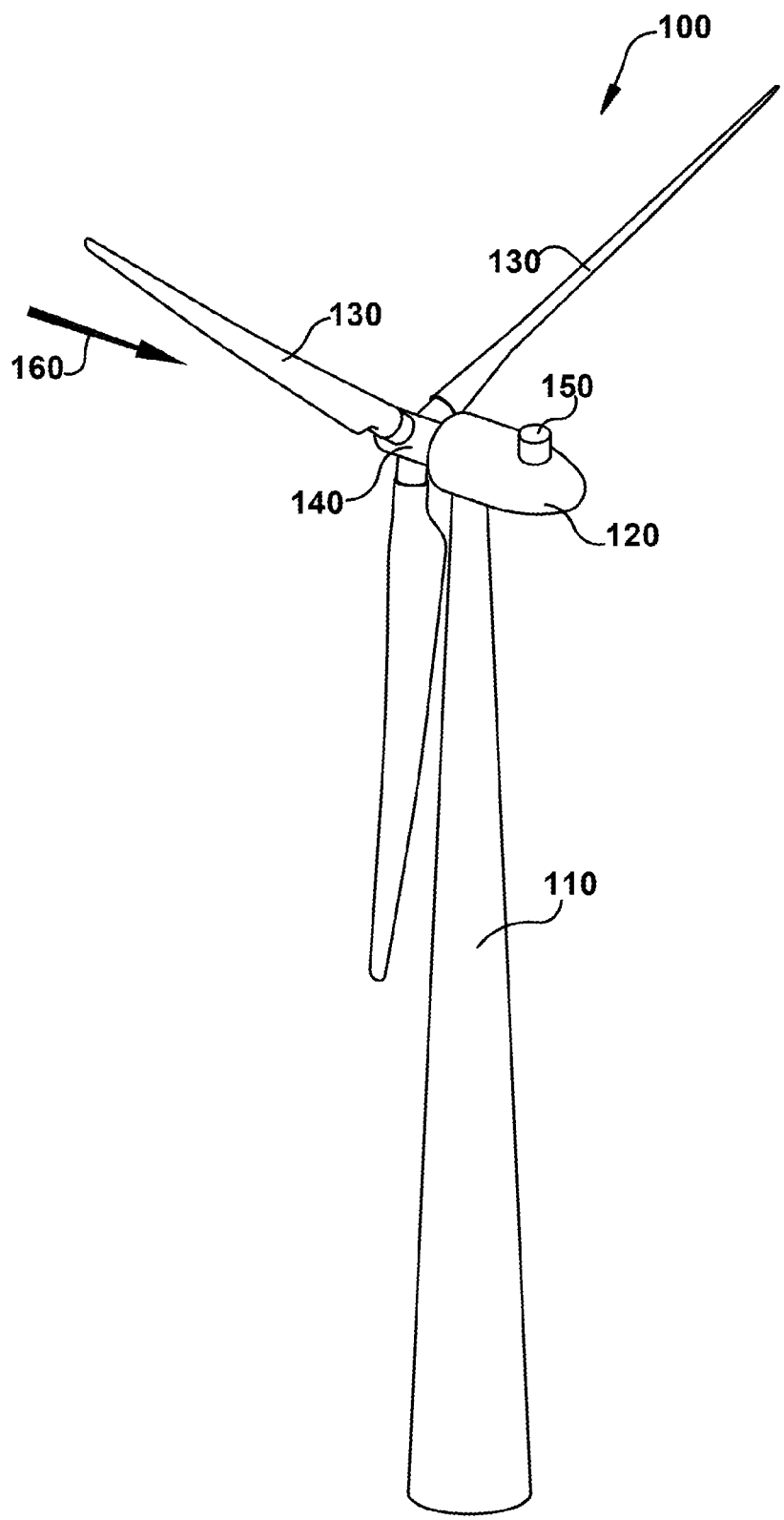
FIG. 1 is a perspective illustration of an exemplary wind turbine.

A typical commercial horizontal axis wind turbine (HAWT), hereafter "wind turbine", 100 is illustrated in FIG. 1. The wind turbine 100 may include a tubular tower 110, which is often manufactured of steel. The tower 110 may be erected by stacking multiple tower segments on top of each other. The tower 110 supports the weight of the nacelle 120, blades 130 and hub 140. Towers may also be of the lattice (or truss) type, and tubular towers may alternatively be formed of concrete or other suitable materials. The nacelle 120 typically houses the drive train (e.g., gearbox, shafts, couplings, generator, etc.), as well as the main frame (also called bedplate) and yaw drives. Other items such as the control electronics may be housed within the nacelle 120 as well. Typically, the nacelle 120 has an outer skin that is comprised of a lightweight material such as fiberglass or a graphite composite. The main function of the nacelle skin is to protect the contents from the elements (e.g., rain, ice, snow, etc.).

The blades 130 are connected to the hub 140, and the hub may contain a pitch control mechanism to control the pitch angle of each blade. Typically, three blades are employed in most commercial wind turbines. However, one, two or four or more blades could be employed as well. The blades convert the kinetic energy of the wind into mechanical energy by rotating a low speed shaft. Blades may be manufactured from fiberglass, graphite composites, fiberglass reinforced plastics or wood/epoxy laminates, or other suitable materials. The low speed shaft is connected to the hub 140 typically via a bolted flange coupling.

Typically, in turbines greater than 1 MW, the low speed shaft will rotate at a variable speed depending upon the wind speed, from zero up to a maximum steady-state speed being generally the rated (e.g., maximum) speed of the turbine whereby the turbine is producing rated power. The rated rotation speed at the rated power of the turbine is a function of power rating, blade length, wind class, etc. and will vary typically from about 12 to about 22 RPM for a 1.5 MW turbine down to about 8 to about 16.5 RPM for a 2.5 MW turbine. Rated rotation speeds of the low speed shaft can vary above or below these ranges as well.

Generators are used to convert the rotation of a shaft into electrical energy. A gearbox is typically used to increase the speed of the input shaft to the generator. The gearbox has the low speed shaft as its input, and the output is a higher speed shaft, which can feed directly into the generator or couple to the generator's input shaft.

The nacelle 120 can include wind-measuring devices 150, such as anemometers. The wind measuring devices 150 can measure wind speed and/or wind direction. A common location for these wind-measuring devices is on the rear portion of the nacelle 120. During operation of wind turbine 100, wind flows in the direction of arrow 160, and it can be seen that wind-measuring devices 150 are located downwind (i.e., leeward) of the hub 140, blades 130, tower 10 and most of nacelle 120. The disadvantage to this location is that the wind is acted upon by many elements (e.g., hub, blades, tower) before the wind reaches the wind measuring devices 150. Accordingly, it is difficult to get an accurate measurement of the wind before it impinges on the blades 130.

Wind turbines operate in a three (3) dimensional airflow field. Optimum wind turbine operation depends on knowledge of certain wind flow field characteristics in this three dimensional space. The three-dimensional wind flow field can encompass the entire rotor area in front of the turbine and can be measured effectively with the present invention.

Figure 12:
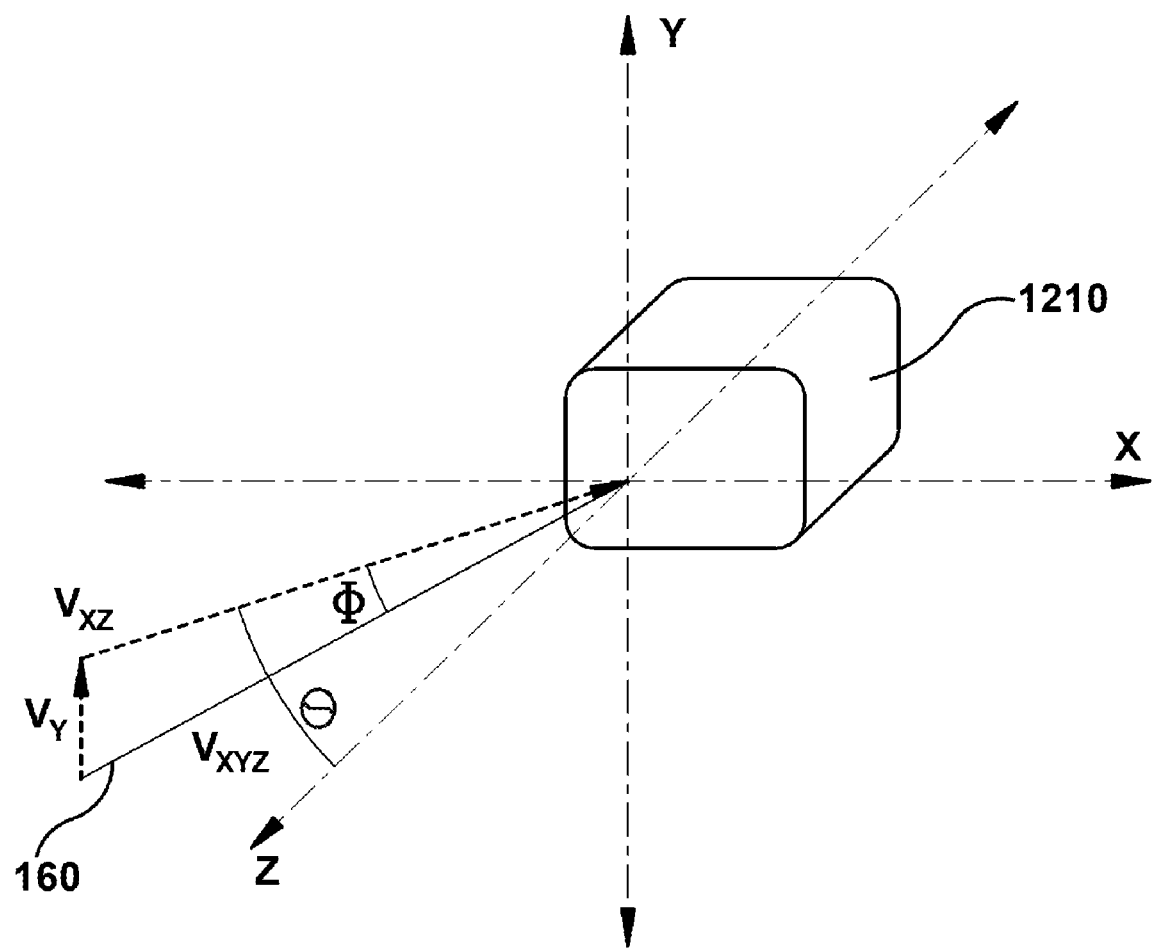
FIG. 12 is an illustration of three dimensional axes with respect to the wind turbine, and the illustration aids in the discussion of the various components of wind.

FIG. 12 illustrates a graphical representation of the various spatial axes with respect to the nacelle (generally illustrated at 1210). The wind is represented by wind vector 160. There are multiple characteristics of interest to the wind turbine control system relative to the nacelle origin XYZ coordinate system. These can include, but are not limited to, the horizontal wind direction in the XZ plane, $\theta$, which comprises the angle of the horizontal wind speed vector, $V_{XZ}$, relative to the Z-axis. The horizontal wind speed in the XZ plane, is comprised of the magnitude of the $V_{XZ}$ vector. The vertical wind speed in the Y-axis, is comprised of the magnitude of the $V_Y$ vector. The vertical wind direction, $\phi$, is comprised of the angle of the of the $V_{XYZ}$ vector relative to the XZ plane. The absolute wind velocity, is comprised of the magnitude of the $V_{XYZ}$ vector, and the three vector components of $V_{XYZ}$ that are projected onto the XYZ axes. All or some of these characteristics can be used to control the operating modes of the wind turbine.

Figure 2:
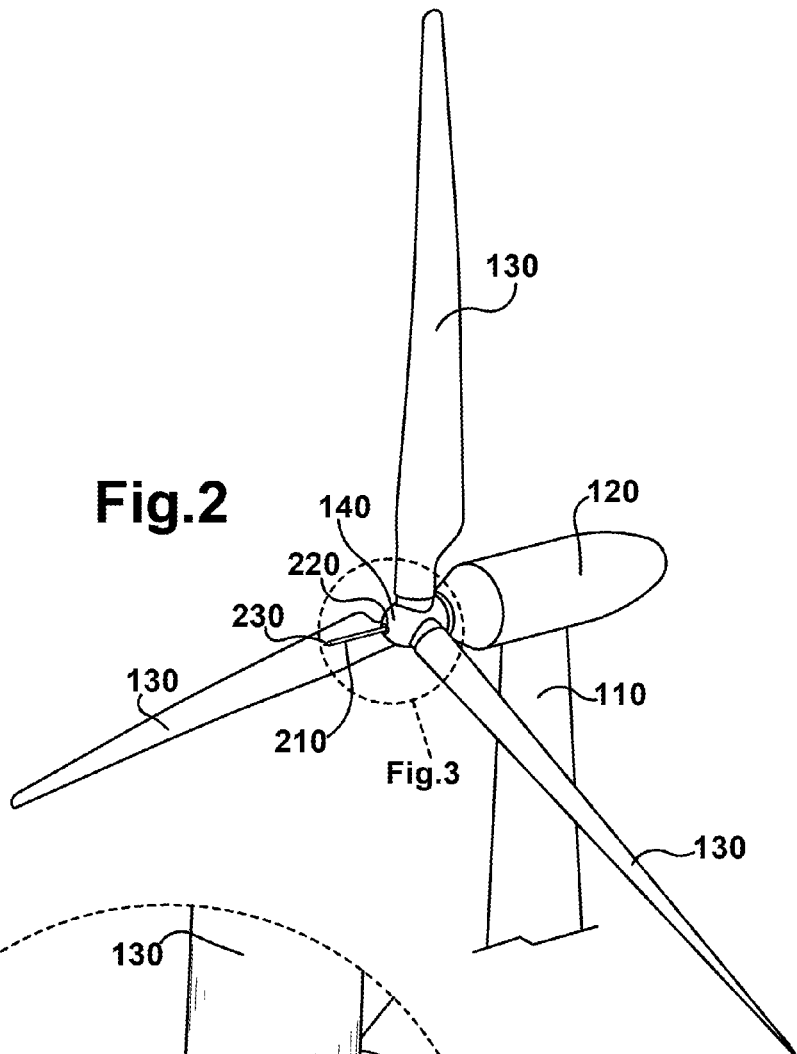
FIG. 2 is a partial, perspective view of a wind turbine according to aspects of the present invention.

Referring to FIG. 2, and according to one embodiment of the present invention, an improved system for measuring wind speed and wind direction is illustrated. A boom 210 is mounted on the nosecone 220 portion of hub 140. In some embodiments, the nosecone 220 may be viewed as a portion of hub 140. The boom can extend, axially in-line with the Z-axis according to FIG. 1 outward from the nosecone (i.e., typically this position will be in the windward or upwind direction when the wind turbine is properly yawed) from about one to about ten meters or more. In other embodiments the boom can be axially offset with respect to the Z-axis. The boom could also be less than one meter in length. The boom 210 can have a wind sensor device 230 attached to or near its end. In alternative embodiments, more than one wind sensor device 230 could be attached to the end or other parts of boom 210.

Figure 3:
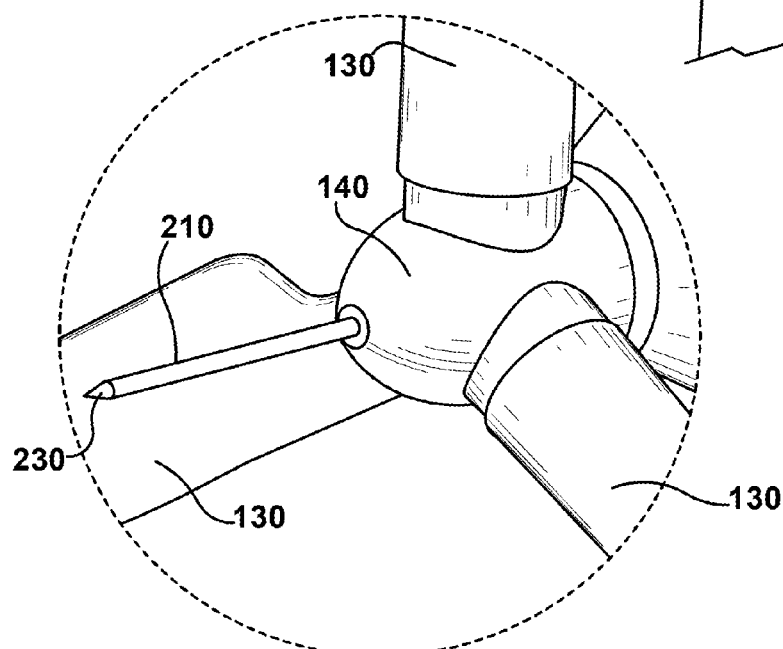
FIG. 3 is an enlarged partial, perspective view of a wind turbine according to aspects of the present invention.

FIG. 3 illustrates an enlarged view of one embodiment of the present invention. Wind sensor device 230 can be chosen from a number of wind sensing devices. For example, wind sensor device 230 could be chosen from the group comprising pressure anemometers, ultrasonic anemometers, pitot-tube anemometers, acoustic Doppler anemometers, laser Doppler anemometers, propeller anemometers, and cup anemometers.

It can be seen that the wind-sensing device 230 is located outward from, or in front of, the wind turbine 100. The wind sensing device 230 may also be viewed as being located in a direction of the oncoming wind 160 during properly yawed operation of wind turbine 100. If the wind turbine is facing generally into the wind, the wind must pass by sensor 230 before it reaches the blades 130. This upwind or windward placement of wind sensing device 230 is at an improved location for sensing wind characteristics during properly yawed operation One main advantage the present invention provides, is that the wind can be sensed before it is affected by the turbine structural components such as the nosecone, hub, blades, nacelle or tower of the wind turbine. The systematic errors, in wind sensing, produced by the fluid flow phenomena caused by the wind turbine elements can be avoided by having the wind-sensing device 230 located axially in-line (or axially offset) with the Z axis in front of the turbine nosecone 220.

FIG. 4 illustrates a propeller anemometer 430 used to measure wind speed. One, two, three or more propellers could be mounted on boom 210 to measure various wind characteristics. The propeller rotational speed can be translated to the z-axis and x-axis component of the horizontal wind speed vectors (for horizontally arranged propellers). By mounting more than one propeller on boom 210, where each propeller is facing a different direction, additional wind characteristics (e.g., horizontal wind direction, horizontal wind speed, vertical wind speed, vertical wind speed direction, etc.) can be determined.

FIG. 5 illustrates a side view, and FIG. 6 illustrates an end view of a 5-hole pressure anemometer 530 that can be motmted on boom 210. The pressure at each sensor 540 can be measured and used to calculate various wind characteristics. For example, the 5-hole probe 530 could measure the stagnation and static pressure of the oncoming air, in addition to the differential pressure differences produced due to off axis flow (horizontal wind direction), and a differential pressure due to a vertical wind vector (upflow or downflow). From these measurements the horizontal wind speed, horizontal wind direction, vertical wind speed, vertical wind direction, absolute wind velocity, etc. can be calculated. Pressure measurement sensors often benefit from having an air density measurement system that corrects for air density effects on fluid pressures to more accurately calculate the air velocity components. Air density sensors (not shown) can be included in the boom 210, nacelle 120 or other parts of wind turbine 100.

FIG. 7 illustrates an end view of a 7-hole pressure anemometer that may be mounted on boom 210. The main difference in 3-hole, 5-hole, and 7-hole pressure anemometers is their angular resolution capability. Seven-hole anemometers are highly accurate until the velocity vector reaches a total angle of about 70 degrees with respect to the flow. Five-hole anemometers are highly accurate until the velocity vector reaches a total angle of about 60 degrees with respect to the flow. Accordingly, five-hole or seven-hole pressure anemometers have a more desired degree of accuracy and are preferred for accurate positioning and manipulation of wind turbine 100.

Ultrasonic anemometers could also be used for wind sensing device 230. Ultrasonic anemometers having multiple sensing elements and multiple ultrasonic sound paths arranged in various linear orientations within 3 dimensional or 2 dimensional space, would be able to determine many wind characteristics including air temperature. Each pair of transducers can have a linear line of sight in three dimensional or two dimensional space.

FIG. 8 illustrates a boom incorporating an ultrasonic sensor 800, and FIG. 9 illustrates an end-view of ultrasonic sensor 800. In this embodiment, a three pair ultrasonic sensor is mounted on the end of boom 210. The sensor comprises three pairs of ultrasonic transducers, for a total of six individual transducers. Three ultrasonic transducers 810 can be located at the ends of arms 830 and three ultrasonic transducers 820 can be located at the end of the boom extension. The transducers 810 and 820 can be oriented in a linear fashion to provide a direct line of sight to the transducer's corresponding sensing partner. Each transducer 810, 820 can act as a transmitter and receiver. One transducer 810 and one transducer 820 comprise a pair of ultrasonic sensors.

The boom 210 can be mounted to the hub 140 so that the hub 140 and boom 210 rotate together. In this configuration the sensor system 800 also rotates with the hub 140 and boom 210. This rotation can be used to enable the sensor 800 to continuously scan the region in front (i.e., upwind) of the wind turbine 100. The arms 830 can be configured to collapse against boom 210 to allow for retraction of the boom inside hub 140 for ease of maintenance and/or repair of the ultrasonic sensor 800. Conversely, when the boom is extended from the hub 140 the arms can deploy to the configuration as shown in FIG. 8. In other embodiments the boom 210 can be arranged to incorporate telescopic sections. The boom 210 can be manufactured from materials such as carbon fiber composites, fiberglass, steel, aluminum and other suitable materials as well.

In operation, transducer 810 can send an ultrasonic signal to transducer 820. The transducers then switch "roles" and transducer 820 sends an ultrasonic signal back to transducer 810. This can be considered one pass. The acoustic signal pass can occur for each of the three sensor paths. One pass may be acceptable, however multiple passes may be utilized depending on signal quality and the desired resolution of the wind characteristics relative to the rotor position angle, which rotor position angle can be defined as the angle in the XY plane that a line of origin on one of the blades makes with the X axis. The time travel of the acoustic signal can be measured, averaged, and the velocity deduced. The ultrasonic signals can be used to determine the magnitude of the three velocity vectors in-line with each sound path, relative to the current rotor position angle. The sensor 800 can scan the wind conditions in three dimensions. For example, within a total elapsed time interval of about 5 milliseconds, depending on rotor rotational speed, the rotor or hub 140, boom 210 and sensor 800 will rotate through about one degree of arc. The ultrasonic sensor 800 has three pairs of sensor paths, and the pairs of sensor paths (810, 820) are oriented orthogonally in a rotating three dimensional coordinate system which rotates with the rotor. The signals from the sensor 800 can be sampled very rapidly (e.g., every 5 milliseconds).

A wind speed sensor system (not shown) can use the rotor angular position signal (which is normally available from the wind turbine control system) to mathematically resolve the absolute velocity vector measured at a specific time interval into an orthogonal x-y-z fixed coordinate system that can be oriented with the wind turbine structure using three dimensional matrix transformations of the absolute velocity vector from the rotating coordinate system. The wind speed sensor system can then, using geometric formulations and transformations, compute horizontal wind speed, horizontal wind direction, vertical wind speed, vertical wind direction, three dimensional wind velocity, and the three XYZ components of the 3D wind velocity. The wind speed sensor system can then communicate these wind characteristics to the wind turbine control system. The wind turbine control system can then take actions to improve or maximize the energy capture from the airstream and minimize or reduce the mechanical stresses on the wind turbine 100.

FIG. 10 illustrates a two-pair ultrasonic sensor 1000, and FIG. 11 illustrates an end-view of ultrasonic sensor 1000.

This sensor 1000 operates similarly to the sensor illustrated by and described in conjunction with FIG. 8. The main difference is that this sensor employs only two pairs of transducers 810 and transducers 820. The two pair system can be used to measure wind in three dimensions because it can rotate and acquire the vertical wind flow conditions. In other embodiments, four or more pairs of sensors could be employed.

The wind-sensing device 230 may also be configured with cup anemometers having three to four cups. Hot wire sensors, which use the electrical resistance of the wire in determining wind speed, may also be used. Pitot tube anemometers, a type of pressure anemometer, is another option for wind sensing device 230. A combination of different types of anemometers may also be deployed on boom 210. For example, a combination of pressure sensors and ultrasonic sensors, located on boom 210, may be used to determine various wind characteristics. It may also be advantageous, in some situations, to have at least one wind sensor located near the rear of the turbine. A rear mounted sensor could help if the wind turbine was facing in a leeward direction (i.e., the wind is coming from behind the wind turbine). Alternatively, for front-mounted sensors (as shown in FIG. 2), one could use modeling or empirical data to correct the measured wind conditions (in front of the wind turbine) for the effect of the nacelle on the wind when the wind is coming from behind the nacelle.

The boom 210 could be arranged to rotate or not rotate with respect to the nose cone 220. A stationary (i.e., non-rotating) boom would require a mounting in or on the nose cone or hub. The stationary boom mounting means could comprise a system of bearings and counterweights. A rotating boom could be mounted directly to the nose cone 220 and would be easier to attach. However, a rotating boom would require the data from the wind measuring devices (which would also rotate) to be synchronized to the rotation of the rotor. Data from the wind measuring devices could be timed and taken at specific intervals relating to specific rotor angular positions. Another advantage to a rotating boom, is that a wind measuring device could have fewer sensors, but still be capable of increased angular resolution and three dimensional wind characteristics measurement (due to the rotation of the individual sensor elements). The boom could also be designed to have stationary (non-rotating) and rotating sections. For example, a two-part boom could have the first section mounted to the nose cone, so that the first section rotates in synchronism with the hub. The second section, located further away from the nose cone, could be coupled to the first section via bearings and counterweights, so that it does not rotate. Either one or both sections could contain wind-measuring devices. The boom may also be designed to telescope and/or have a hinged base. The telescoping and hinged base features would make it easier for service personnel to access and maintain the wind measuring devices on the boom. In addition, anti-icing capability could also be incorporated into the wind measuring system, which may include heating elements in the boom, boom extension, and/or sensor mounting arms, etc.

Boom 210 allows the wind measuring devices to be placed away from any structures that may interfere with the wind. Even wind measuring sensors mounted directly on and adjacent to the hub 140 and nosecone (220) can be affected by fluid phenomena caused by the wind turbine structure. It has been found that by locating the wind measuring devices one to six meters or more in front of (e.g., outward from) the turbine, very accurate readings of wind conditions can be obtained that are independent of the wind turbine's physical characteristics.

The wind characteristics that could be measured may include horizontal wind speed, horizontal wind direction, vertical wind speed, vertical wind direction, absolute wind speed, and the three individual velocity vectors in three-dimensional space. Individual characteristics can be used alone or in combination to determine appropriate control sequences to maximize energy capture and/or minimize or reduce mechanical stresses on the wind turbine 100. The horizontal wind direction could be used to adjust the yaw direction to more optimally position the wind turbine so that it faces directly into the wind. All or some of the wind speed vectors may be used to adjust the pitch of the blades so that energy capture is maximized and/or to minimize mechanical stresses on the wind turbine. Controllers, processors or other suitable equipment can be used to process received sensor data (e.g., from wind measuring devices) and output various control signals to control the various operating modes or operating characteristics (e.g., yaw direction, blade pitch angle, etc.) of wind turbine 100.

While various embodiments are described herein, it will be appreciated from the specification that various combinations of elements, variations or improvements therein may be made, and are within the scope of the invention.

What is claimed is:

1. A wind turbine comprising:
   at least one wind sensor for determining at least one wind characteristic, the at least one wind characteristic chosen from the group comprising, at least one of, wind direction, wind speed, horizontal wind speed, horizontal wind direction, vertical wind speed, vertical wind direction, and absolute wind velocity;
   said at least one wind sensor located at a predetermined distance outward from a nosecone of said wind turbine, the predetermined distance between about one to about ten meters, the at least one wind sensor comprising an anemometer, the at least one wind sensor mounted on a boom extending in a substantially horizontal direction, the boom mounted on the nose cone, the boom further comprising a plurality of deployable arms supporting the at least one wind sensor, and the boom being about one to about ten meters in length; and
   wherein, at least one operating mode of the wind turbine is controlled based on said at least one wind characteristic, the at least one operating mode chosen from, at least one of the group comprising, yaw direction and blade pitch angle.

2. The wind turbine of claim 1, wherein said at least one wind sensor is chosen from the group comprised of:
   a two-pair ultrasonic anemometer, a three-pair ultrasonic anemometer, a five-hole pressure anemometer or a seven-hole pressure anemometer.

3. The wind turbine of claim 1, wherein, at least a portion of said boom and said nosecone rotate together.

4. The wind turbine of claim 1, wherein, at least a portion of said boom is stationary with respect to rotation of said nosecone.

* * * * *

UNITED STATES PATENT AND TRADEMARK OFFICE
CERTIFICATE OF CORRECTION

PATENT NO. : 8,235,662 B2
APPLICATION NO. : 11/869011
DATED : August 7, 2012
INVENTOR(S) : LeClair et al.

It is certified that error appears in the above-identified patent and that said Letters Patent is hereby corrected as shown below:

In Column 5, Lines 26-27, delete "motmted" and insert -- mounted --, therefor.

In Column 7, Line 31, delete "countenveights." and insert -- counterweights. --, therefor.

In Column 8, Line 13, delete "ad just" and insert -- adjust --, therefor.

Signed and Sealed this
Twentieth Day of November, 2012

David J. Kappos
*Director of the United States Patent and Trademark Office*